United States Patent
Löhr

[11] 3,814,066
[45] June 4, 1974

[54] AIR COMPRESSING INTERNAL COMBUSTION ENGINE WITH DIRECT INJECTION

[75] Inventor: Joachim Löhr, Nuremberg, Germany

[73] Assignee: Maschinenfabrik Augsburg-Nurnberg Aktiengesellschaft, Nurnberg, Germany

[22] Filed: July 28, 1971

[21] Appl. No.: 166,675

[30] Foreign Application Priority Data
July 31, 1970 Germany............................ 2038048

[52] U.S. Cl. .............................. 123/32 R, 123/32 C
[51] Int. Cl. .............................................. F02b 1/12
[58] Field of Search .. 123/30 R, 30 C, 32 R, 32 ST, 123/32 SP

[56] References Cited
UNITED STATES PATENTS

| | | | |
|---|---|---|---|
| 2,305,801 | 12/1942 | Wiehnke | 123/30 R |
| 2,767,692 | 10/1956 | Barber | 123/32 R |
| 2,921,566 | 1/1960 | Meurer | 123/32 R |
| 2,959,160 | 11/1969 | Bottger | 123/32 R |
| 2,975,773 | 3/1961 | Meurer | 123/32 R |
| 2,982,270 | 5/1961 | Seegelken | 123/32 R |
| 3,085,557 | 4/1963 | Meurer | 123/32 R |
| 3,424,137 | 1/1969 | Guentler | 123/30 R |

FOREIGN PATENTS OR APPLICATIONS

| | | | |
|---|---|---|---|
| 2,004,536 | 11/1970 | Germany | 123/30 D |

*Primary Examiner*—Laurence M. Goodridge
*Attorney, Agent, or Firm*—Walter Becker

[57] ABSTRACT

An air compressing direct injection internal combustion engine in which either the reciprocatory piston or the pertaining cylinder head has a ball-shaped combustion chamber therein which is provided with a neck that is constricted with regard to the diameter of said combustion chamber and which is adapted so to receive the combustion air as to circulate the same in said combustion chamber, the ratio of the diameter of the said combustion chamber to the diameter of said neck being less than or at the maximum equalling 1.15 while the fuel injection nozzle is so directed toward the inside of said combustion chamber that the point of impact of the fuel jet upon the inside surface of said combustion chamber is located in that quarter of the combustion chamber which is remote from and opposite to said constriction.

1 Claim, 3 Drawing Figures

INVENTOR
Joachim Löhr

AIR COMPRESSING INTERNAL COMBUSTION ENGINE WITH DIRECT INJECTION

The present invention relates to an air compressing internal combustion engine with direct injection which has a ball-shaped combustion chamber provided in the piston or cylinder head which combustion chamber is provided with a neck constricted with regard to the diameter of the combustion chamber. More specifically, the invention concerns an internal combustion engine of the just mentioned type in which the major portion of the liquid fuel is in the form of a film injected onto the wall of the combustion chamber while the air supplied to the combustion chamber rotates about the longitudinal axis of the combustion chamber.

It is a well known fact that in particular with internal combustion engines of the above described type during the idling stroke and also in the lower and medium partial load range the formation of blue smoke occurs which has a polluting effect and irritates the eyes and affects the breathing. The reason for the formation of blue smoke is too low a temperature of the wall of the combustion chamber so that a satisfactory combustion cannot take place. A poor combustion, on the other hand, aids in the formation of aldehydes, acroleine, specific hydrocarbons, among others, in the exhaust gases.

To overcome these drawbacks it has been suggested to increase the compression ratio of the engine or to employ a twist inhibitor for the rotating air in the combustion chamber. Furthermore, the location of the fuel jet was within these ranges of operation changed to such an extent that the proportion of the fuel directly intermixed with the combustion air became correspondingly greater.

While by the above referred to measures a corresponding decrease in the formation of blue smoke and irritating substances in the exhaust gases was realized, these steps are not satisfactory because the additional means for practicing these measures bring about an increase in costs and a decrease in the performance of the engine, especially under full load. Furthermore, any additional means always increase the possibility of disorders.

It has furthermore been suggested by simple means to extend the fuel injection period in the lower speed range in order to prevent a more pronounced fuel jet formation. This suggestion brings about an improvement but still fails to lead to the hoped for result.

It is, therefore, an object of the present invention, with internal combustion engines of the above mentioned type, to find a new way and means by which it will be possible in a simple and uncomplicated way and without increasing the costs of the engine and without reducing the performance of the engine to obtain a maximum reduction in the formation of blue smoke.

This object and other objects and advantages of the invention will appear more clearly from the following specification in connection with the accompanying drawing, in which.

The problem underlying the present invention has been solved according to the present invention by making the ratio of the diameter of the combustion chamber to the diameter of the neck of the combustion chamber less than or at maximum equal to 1.15 while the point where the fuel jet impacts upon the wall of the combustion chamber is by a corresponding selection of the nozzle angle and the nozzle location located within the lower quarter of the combustion chamber.

While it was heretofore considered necessary to make the ratio of the diameter of the combustion chamber to the diameter of the neck of the combustion chamber higher or at least equal to 1.2 to obtain the necessary turbulence in the combustion chamber, it it has now been found and proven by numerous tests that this ratio is by no means binding if at the same time the point where the fuel jet impacts upon the wall of the combustion chamber is correspondingly changed. In contradistinction to the present invention, this impact point was heretofore located in the plane of the maximum diameter of the combustion chamber or slightly therebelow.

Figure 1:
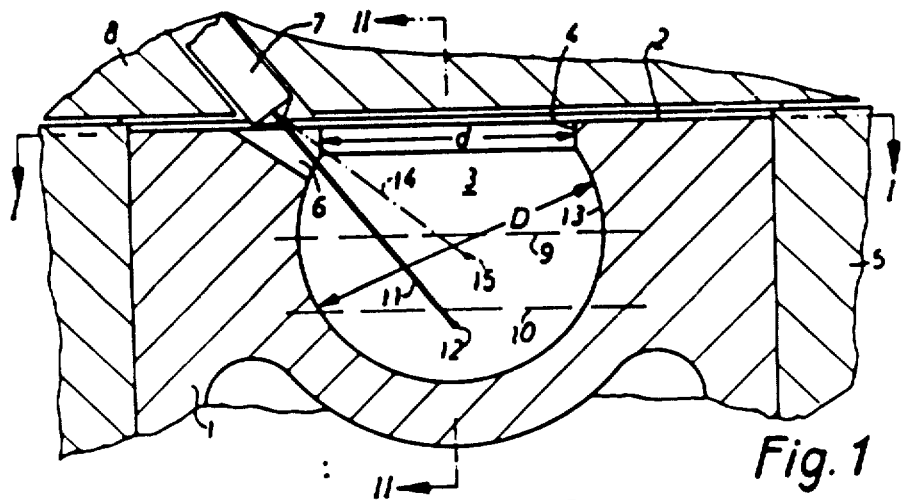
FIG. 1 illustrates a longitudinal section through the upper portion of a piston in a cylinder and also shows a fuel jet in the arrangement according to the present invention.
Figure 2:
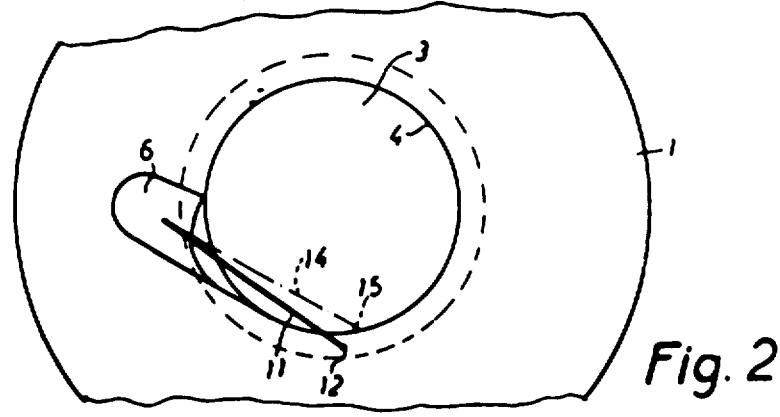
FIG. 2 is a top view of the piston shown in FIG. 1 and, more specifically, along the line I — I of FIG. 1.
Figure 3:
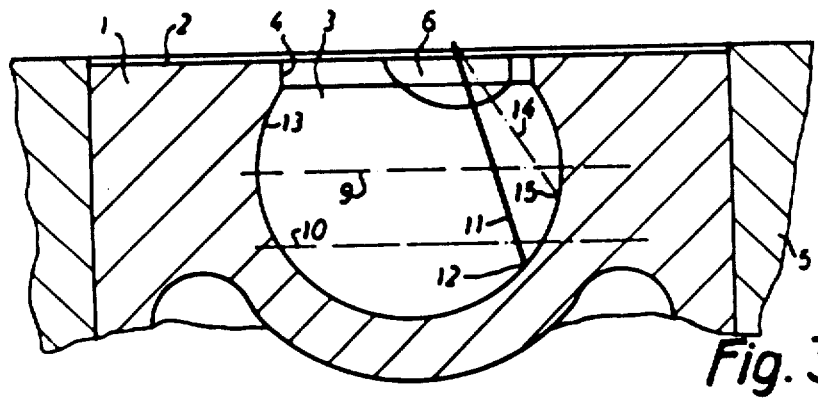
FIG. 3 represents a section taken along the line II — II of the cylinder-piston arrangement of FIG. 1.

Referring now to the drawing in detail, the piston 1 shown in part only in FIGS. 1–3 has its piston bottom 2 provided with a ball-shaped combustion chamber 3 having a diameter D. The combustion chamber 3 communicates with the inner chamber of the cylinder 5 through a neck 4 which is constricted to a diameter d. A cutout 6 in the neck 4 serves for injecting the fuel by means of the invention nozzle 7 which is arranged in the cylinder head 8 at an incline. The ratio of the diameter D of the combustion chamber to the diameter d of the neck 4 is termed the opening ratio and is less than or at maximum equal to 1.15.

The equatorial plane of the combustion chamber 3 is indicated by the dot-dash line 9 while half of the lower portion of the combustion chamber 3 is indicated by a dot-dash line 10. An arrow 11 indicates the direction which is followed by the fuel jet in conformity with the invention, the jet impacting upon the wall 13 of the combustion chamber at the point 12. This impact point 12 is clearly located in the lower quarter of the combustion chamber 3. The dot-dash line 14 indicates the direction of the fuel jet as it was heretofore customary while the point 15 shows the impact point with a heretofore known arrangement of the type involved. The change in the direction of the jet is obtained by decreasing the nozzle angle which represents the maximum deviation of the direction of the jet from the nozzle axis and can be realized by a corresponding turning of the injection nozzle 7. The nozzle angle is, depending on the location of the nozzle support in the cylinder head, decreased by approximately from 5 to 7 degrees.

As will be evident from the above, the improvements according to the present invention bring about a considerable reduction in the development of blue smoke in the lower road range, whereas in particular in the full load range no decrease in the performance of the engine will occur. Corresponding tests have shown that with the arrangement according to the invention even a reduction in the air twist in the combustion chamber is possible whereby an improvement in the delivery rate and a reduction in the gas change losses will be realized. Thus, in conformity with a further development of the invention, it is suggested that the ratio of the circumferential speed of the rotating air charge to the axial speed thereof is less than or at a maximum equal to four while the circumferential speed, with regard to the measuring diameter (0.7 cylinder diameter) and the maximum valve stroke, and the axial velocity is equal to the medium piston speed. This ratio was heretofore customarily selected to be 4.5 ± 0.2. In other words, the rotational frequency of the air in the combustion chamber is, compared to the heretofore selected optimum values — for instance 165 to 175 Hertz — , lowered by approximately 10 percent to 150 to 155 Hertz. These values refer to a medium piston velocity of 10 m/sec and a maximum valve stroke.

It is, of course, to be understood that the present invention is, by no means, limited to the particular showing in the drawing but also comprises any modifications within the scope of the appended claims.

Thus, while the drawing shows the ball-shaped combustion chamber provided in the piston, it may instead also be provided in the cylinder head without in any way affecting the essence of the present invention.

I claim:

1. An air compressing direct injection internal combustion engine having a reciprocatory piston forming a first element and having a pertaining cylinder head forming a second element, one of said elements being provided with a ball-shaped combustion chamber which has a neck that is constricted with regard to the diameter of said combustion chamber and which is adapted to receive the combustion air as to circulate the same in said combustion chamber, the ratio of the diameter of said combustion chamber to the diameter of said neck not exceeding 1.15, said engine also having a fuel injection nozzle associated with said combustion chamber and so directed toward the inside of said combustion chamber that the fuel jet injected by said fuel injection nozzle passes through a plane which is parallel to said neck and is spaced from the opposite end of said chamber one-fourth of the distance from said end to said neck and to a point of impact upon the inside surface of said combustion chamber between said plane and said end to form a thin film of fuel on the wall of said chamber which is removed in vapor form through circulating combustion air, the ratio of the circumferential velocity of the air charge in said combustion chamber to the axial speed of said air charge being not in excess of 4, said circumferential velocity with reference to said measuring diameter (0.7 cylinder diameter) and to maximum valve stroke substantially equalling the mean velocity of said piston.

* * * * *